(12) United States Patent
Bedekar et al.

(10) Patent No.: US 11,310,678 B2
(45) Date of Patent: Apr. 19, 2022

(54) METHODS AND SYSTEMS FOR LINKING A DISTRIBUTED UNIT AND VIRTUAL MACHINE IN A WIRELESS COMMUNICATIONS NETWORK

(71) Applicant: Nokia Technologies OY, Espoo (FI)

(72) Inventors: Anand Bedekar, Glenview, IL (US); Kevin Dombkowski, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/760,772

(22) PCT Filed: Nov. 2, 2017

(86) PCT No.: PCT/US2017/059696
§ 371 (c)(1),
(2) Date: Apr. 30, 2020

(87) PCT Pub. No.: WO2019/089027
PCT Pub. Date: May 9, 2019

(65) Prior Publication Data
US 2020/0267576 A1    Aug. 20, 2020

(51) Int. Cl.
*H04W 24/02* (2009.01)
*H04L 43/0829* (2022.01)
*H04L 43/0852* (2022.01)
*H04L 67/10* (2022.01)
*H04W 24/10* (2009.01)
*H04W 84/04* (2009.01)

(52) U.S. Cl.
CPC ......... *H04W 24/02* (2013.01); *H04L 43/0829* (2013.01); *H04L 43/0852* (2013.01); *H04L 67/10* (2013.01); *H04W 24/10* (2013.01); *H04W 84/042* (2013.01)

(58) Field of Classification Search
CPC ... H04W 24/02; H04W 24/10; H04W 84/042; H04L 43/0829; H04L 43/0852; H04L 67/10
USPC ........................................................ 370/252
See application file for complete search history.

(56) References Cited

U.S. PATENT DOCUMENTS

| | | |
|---|---|---|
| 2013/0297596 A1 | 11/2013 | Mouline et al. |
| 2016/0191632 A1 | 6/2016 | Mirsky et al. |
| 2019/0037398 A1* | 1/2019 | Eriksson ............... H04W 12/37 |

FOREIGN PATENT DOCUMENTS

WO    WO-2011/049770 A2    4/2011

OTHER PUBLICATIONS

International Search Report PCT/ISA/210 for Application No. PCT/US2017/059696 dated Apr. 25, 2018.

(Continued)

*Primary Examiner* — Gbemileke J Onamuti
(74) *Attorney, Agent, or Firm* — Harness, Dickey & Pierce, P.L.C.

(57) ABSTRACT

Provided is a central server, including a memory storing computer-readable instructions; and at least one processor coupled to the memory, the at least one processor configured to execute the computer-readable instructions to receive a physical location of a distributed unit; generate a list of one or more measurement servers based on the physical location; and send the list of one or more measurement servers to the distributed unit.

20 Claims, 8 Drawing Sheets

(56) References Cited

OTHER PUBLICATIONS

Written Opinion PCT/ISA/237 for Application No. PCT/US2017/059696 dated Apr. 4, 2018.
Extended European Search Report dated May 26, 2021.

* cited by examiner

METHODS AND SYSTEMS FOR LINKING A DISTRIBUTED UNIT AND VIRTUAL MACHINE IN A WIRELESS COMMUNICATIONS NETWORK

This application is the national phase under 35 U.S.C. § 371 of PCT International Application No. PCT/US2017/059696 which has an International filing date of Nov. 2, 2017, the entire contents of which are hereby incorporated herein by reference.

BACKGROUND

Field

One or more example embodiments relate to methods, apparatuses and/or computer-readable storage mediums for linking a distributed unit and central unit in a wireless communications network.

Discussion of Related Art

Developments in $3^{rd}$ Generation Partnership Project (3GPP) $5^{th}$ generation (5G) radio access networks (RANs) have trended towards virtualized Radio Access Network (vRAN) architectures in which part of the processing and network intelligence (including scheduling) takes place in central units (CUs), also referred to as a gNB, located in a cloud data center (sometimes called an edge cloud) and then the data is carried over a transport network to a set of remote units (RUs) (hereinafter referred to as distributed units (DUs)).

The CU may perform RAN control and user plane functions that are less time sensitive. The DU may perform control and user plane functions that are more time sensitive. Functions performed by the DU may have time constraints of 100s of microseconds or a few milliseconds. Examples of functions performed by the DU include the processing of successful or unsuccessful transmission acknowledgements such that retries may be made or new messages sent in specific timing windows, or slots, dictated by applicable standards. Uplink and downlink transmission feedback is processed according to strict rules regarding the timing at which the feedback may be provided to a receiver.

In some vRAN architectures, some of the higher-layer, relatively less time sensitive processing may take place in the edge cloud CUs while the lower physical layer, relatively more time sensitive processing takes place at the non-cloud based DUs. In some vRAN architectures, some of the higher-layer, less time sensitive processing may take place in the edge cloud CUs while the lower physical layer, more time sensitive processing takes place in "far-edge" cloud DUs.

In order to facilitate a RAN, each distributed unit establishes a communication interface with at least one central unit (this communication interface is hereinafter referred to as an "F1 interface"). The F1 interface may be used to communicate non-access stratum (NAS) control plane data that transits via a CU to a core network and Radio Resource Control (RRC) control plane data between user equipment, a DU and the CU.

SUMMARY

Conventionally, in order to establish an F1 interface, a technician manually programs the address of a specific central unit into a distributed unit when the distributed unit is installed. This manual configuration is costly and inefficient, especially considering that wireless providers may manage hundreds of thousands of distributed units.

There may be a plurality of edge-cloud data centers, each including a plurality of central units. The distributed units within a wireless network coverage area may also be densely packed and may provide different wireless services. The determination of which central unit(s) to connect to a particular distributed unit is complex. Also, the determination of a desired central unit(s) may include considerations such as differing transport network characteristics (e.g., latency between the distributed unit and the various central units) and the relationships between distributed units (e.g., coverage overlaps, handovers, multi-connectivity, etc.).

Some example embodiments provide a central server, including a memory storing computer-readable instructions; and at least one processor coupled to the memory, the at least one processor configured to execute the computer-readable instructions to receive a physical location of a distributed unit. The processor is further configured to generate a list of one or more measurement servers based on the physical location. Furthermore, the processor is configured to send the list of one or more measurement servers to the distributed unit.

Some example embodiments provide a distributed unit, including a memory storing computer-readable instructions; and at least one processor coupled to the memory, the at least one processor configured to execute the computer-readable instructions to send a physical location of the distributed unit to a central server. The processor is further configured to receive a list of one or more measurement servers from the central server based on the physical location. The processor is further configured to communicate with the one or more measurement servers. The processor is further configured to obtain one or more performance parameters based on the communication. The processor is further configured to send the one or more performance parameters to the central server. The processor is further configured to receive one or more addresses corresponding to one or more central units from the central server based on the one or more performance parameters. Furthermore, the processor is configured to establish an F1 connection with the one or more central units using the one or more addresses.

Some example embodiments provide a method performed by a central service, the method including receiving a physical location of a distributed unit. The method further includes generating a list of one or more measurement servers based on the physical location. Furthermore, the method includes sending the list of one or more measurement servers to the distributed unit.

BRIEF DESCRIPTION OF THE DRAWINGS

Some example embodiments will become more fully understood from the detailed description given herein below and the accompanying drawings, wherein like elements are represented by like reference numerals, which are given by way of illustration only and thus are not limiting of the example embodiments.

Figure 1:
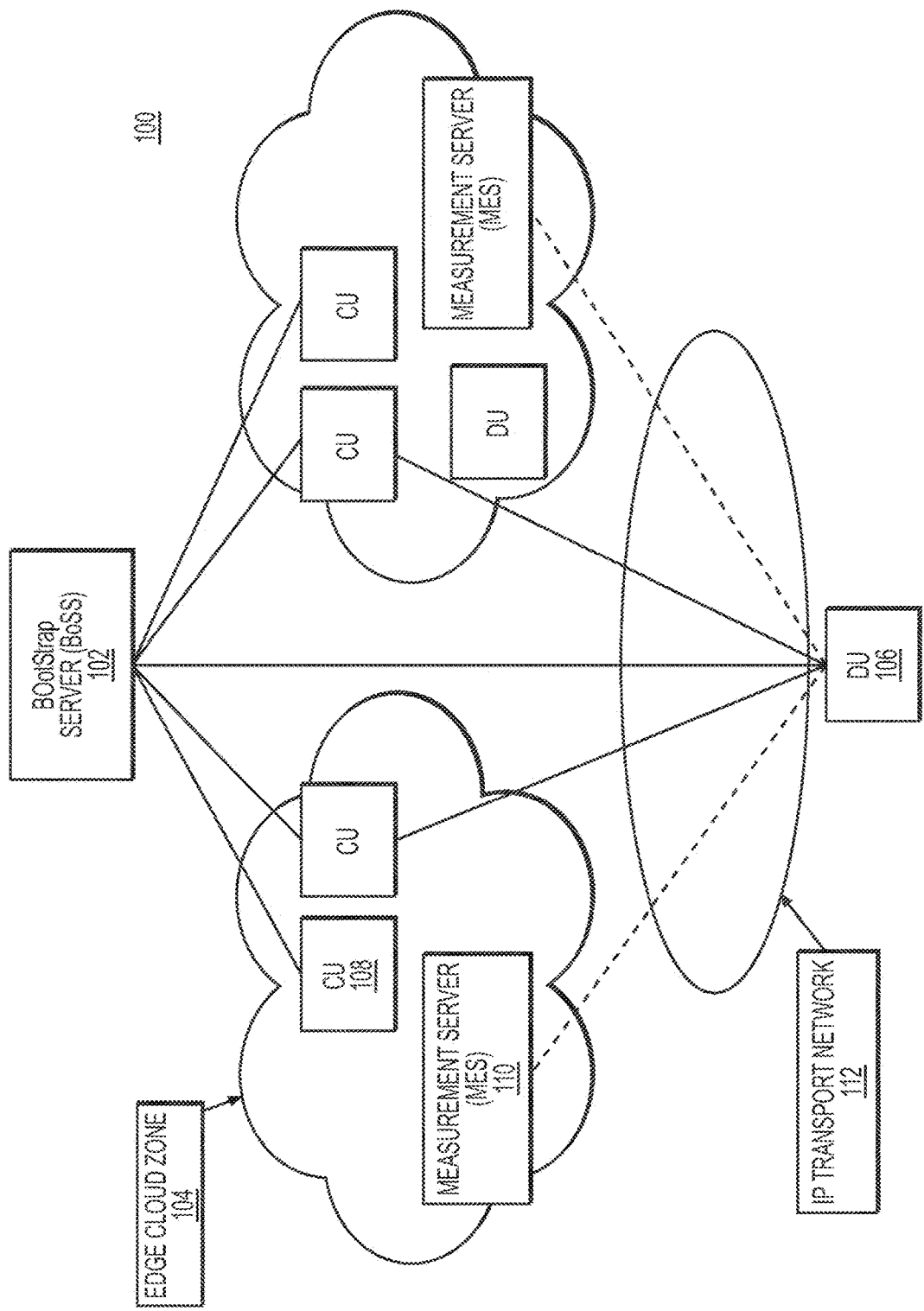
FIG. 1 illustrates a 3GPP 5G RAN architecture, according to some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, the specific structural and functional details are merely representative for the purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of program code, software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

As disclosed herein, the term "memory," "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

According to example embodiments, schedulers, hosts, cloud-based servers, gNB, etc., may be (or include) hardware, firmware, hardware executing software or any combination thereof. In one example, a communications network may include a plurality of different radio interfaces, such as $3^{rd}$ Generation (3G), $4^{th}$ Generation (4G) and $5^{th}$ Generation (5G) interfaces, Wireless Local Area Network (WLAN) standalone hotspots such as WiFi hotspots, and the like, across both the licensed and unlicensed spectra, as well as across macro cells, metro cells and femto cells.

The schedulers, hosts, servers, gNB, etc., may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, Mobility Management Entities (MMEs), controllers, gNBs, servers, client devices, etc.

FIG. 1 illustrates a 3GPP 5G RAN architecture, according to some example embodiments.

Referring to FIG. 1, a wireless communication network 100 includes a BOotStrap Server (BoSS) 102, a plurality of edge-cloud data centers (also referred to herein as "edge cloud zones") 104, and a distributed unit 106. According to some example embodiments, the BoSS 102 may be a virtual function residing on an edge cloud zone 104, in another centralized cloud zone not containing central units 108, or as a physical entity (e.g., laptop) plugged into an Operations, Administration and Maintenance (OAM) network.

Each edge cloud zone 104 corresponds to a logical grouping of computing resources associated with a hosting location, e.g., a data center. Each edge cloud zone 104 may include at least one central unit 108 and at least one measurements server 110. According to some example embodiments, an edge cloud zone may be any suitable hosting location, e.g., a data center, a floor in a building, etc.

The distributed unit 106 may establish a communication link with the BoSS 102, one or more central units 108 and/or one or more measurement servers 110 via an Internet Protocol (IP) transport network 112. According to some example embodiments, the distributed unit 106 may perform scheduling of the uplink and downlink wireless communication interfaces, as well as perform user plane Radio Link Control (RLC), Media Access Control (MAC) and physical layer packet encoding. According to some example embodiments, the distributed unit 106 may be virtualized and included in an edge cloud zone 104 located nearer to radio transmission infrastructure (e.g., cellular tower) than an edge cloud including the one or more central units 108 to which the distributed unit 106 connects. For example, an edge cloud zone 104 may be nearby one or more cell towers and a virtualized distributed unit 106 or a physical distributed unit 106 may be located within or nearby the edge cloud zone 104.

Each central unit 108 may also establish a communication link with the BoSS 102 via an IP transport network. Each central unit 108 may report its IP address, and a zone ID corresponding to the edge cloud zone 104 in which the central unit 108 is instantiated, to the BoSS 102. According to some example embodiments, the central unit 108 may include control and user plane functionality. The central unit 108 may maintain information regarding neighbor cells used for handoffs and handle paging requests from the core network, fault notifications, alarm forwarding to the element management system, and admission control to decide if connections are accepted and how to handle overload situations as they occur. The central unit 108 may also perform Packet Data Convergence Protocol (PDCP) layer of user plane processing. According to some example embodiments, the central unit 108 may be virtualized, for example, the central unit 108 may be implemented using one or more virtual machines, containers, etc. The central unit 108 may be sub-divided into a plurality of network functions, e.g., Centralized Baseband Unit and nrt-L2 functions (CU-CPs) and Centralized Radio Control Units (CU-UPs), referred to as a collection. The central unit 108 may communicate with other central units 108 and with the Core Network (e.g., Access and Mobility Management Function (AMF), Session Management Function (SMF), User Plane Function (UPF), etc.) to set up user equipment control and bearer paths.

While FIG. 1 is discussed in association with a 3GPP 5G RAN architecture, according to some example embodiments, the wireless communication network 100 is or may be a cloud RAN in Long-Term Evolution (LTE).

Figure 2:
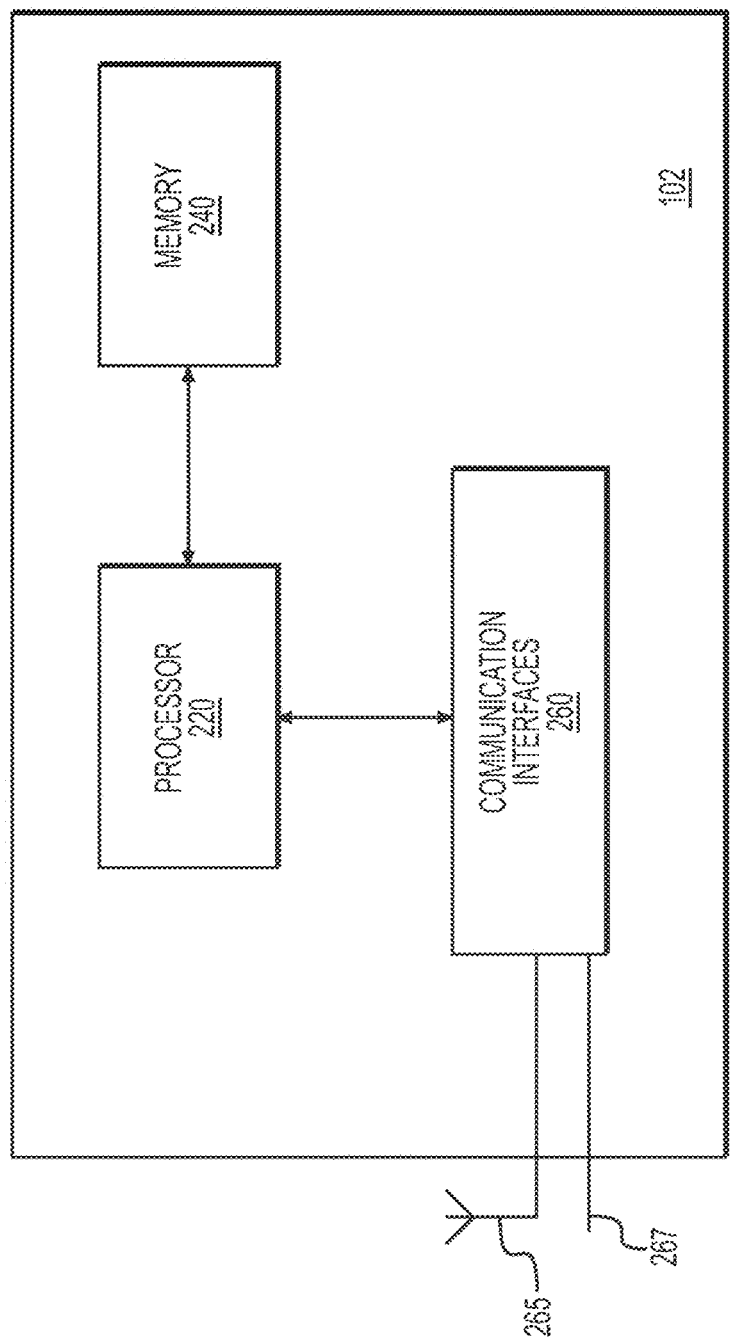
FIG. 2 is a block diagram illustrating the structure of a BOotStrap Server (BoSS), according to some example embodiments.

FIG. 2 is a block diagram illustrating the structure of a BOotStrap Server (BoSS), according to some example embodiments.

Referring to FIG. 2, the BoSS 102 (as described in association with FIG. 1) includes: at least one processor 220 (referred to hereinafter in singular form); a memory 240; and a communication interface 260. The processor 220 is operatively coupled to the memory 240 and the communication interface 260. Operations described herein as being performed by the BoSS 102 may be performed by the processor 220 executing program code that includes instructions corresponding to the operations. The instructions may be stored in the memory 240. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

Still referring to FIG. 2, the communication interface 260 may include various interfaces including one or more transmitters/receivers connected to one or more connections 267 or antennas 265 to transmit/receive (wireline and/or wirelessly, respectively) signals. The memory 240 may store, inter alia, an IP address and zone ID for each central unit in communication with the BoSS 102, and, for each zone ID, a list of measurement servers that are deployed in the edge cloud zone 104 and location coordinates (e.g., latitude and longitude) of the edge cloud data center.

Figure 3:
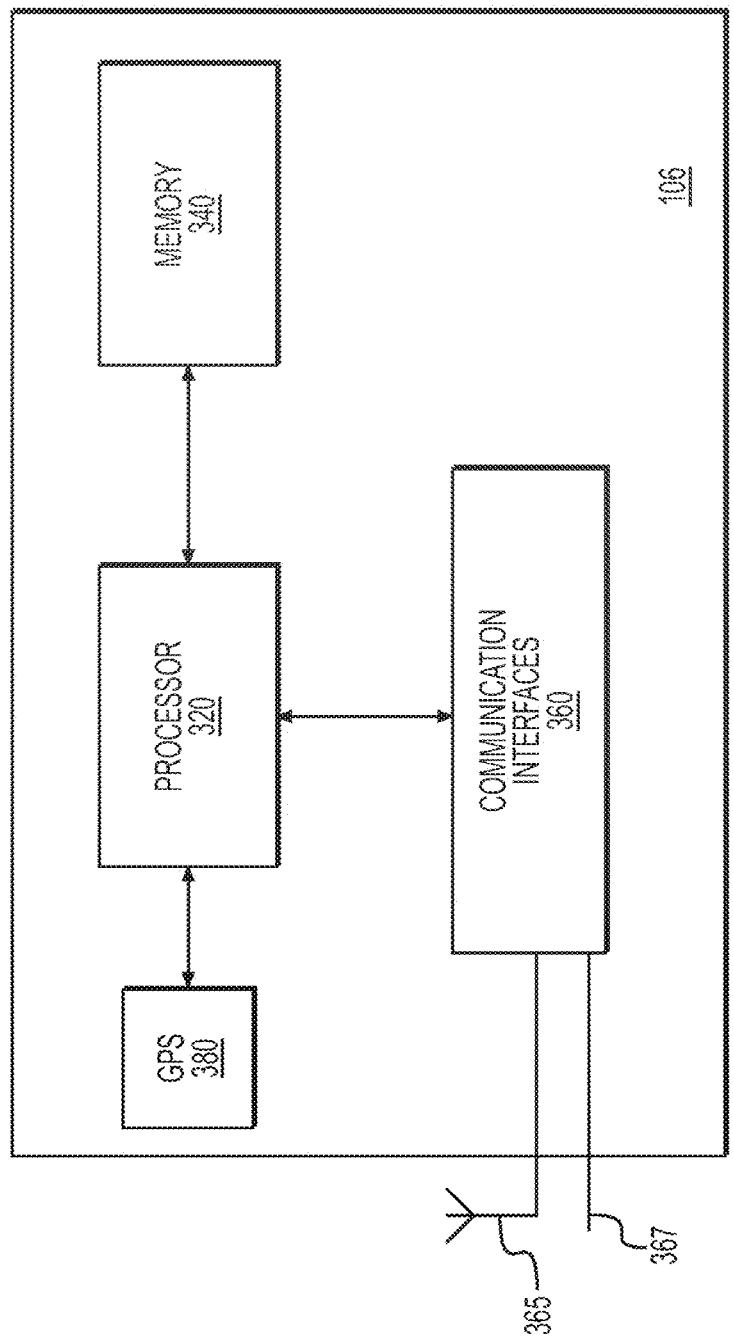
FIG. 3 is a block diagram illustrating the structure of a distributed unit, according to some example embodiments.

FIG. 3 is a block diagram illustrating the structure of a distributed unit, according to some example embodiments.

Referring to FIG. 3, the distributed unit 106 (as described in association with FIG. 1) includes: at least one processor 320 (referred to hereinafter in singular form); a memory 340; a communication interface 360; and a Global Positioning System (GPS) transceiver 380. The processor 320 is operatively coupled to the memory 340, the communication interface 360 and the GPS transceiver 380. Operations described herein as being performed by the distributed unit 106 may be performed by the processor 320 executing program code that includes instructions corresponding to the operations. The instructions may be stored in the memory 340.

The communication interface 360 may include various interfaces including one or more transmitters/receivers connected to one or more connections 367 or antennas 365 to transmit/receive (wireline and/or wirelessly, respectively) signals. The one or more connections 367 may include a connection to an Ethernet or IP wireline network. According to some example embodiments, a F1 link to one or more central units 108 is established over the Ethernet or IP wireline network. The GPS transceiver 380 may be used to determine the physical location of the distributed unit 106 for use in establishing a link with one or more central units 108, as further described below.

Figure 4:
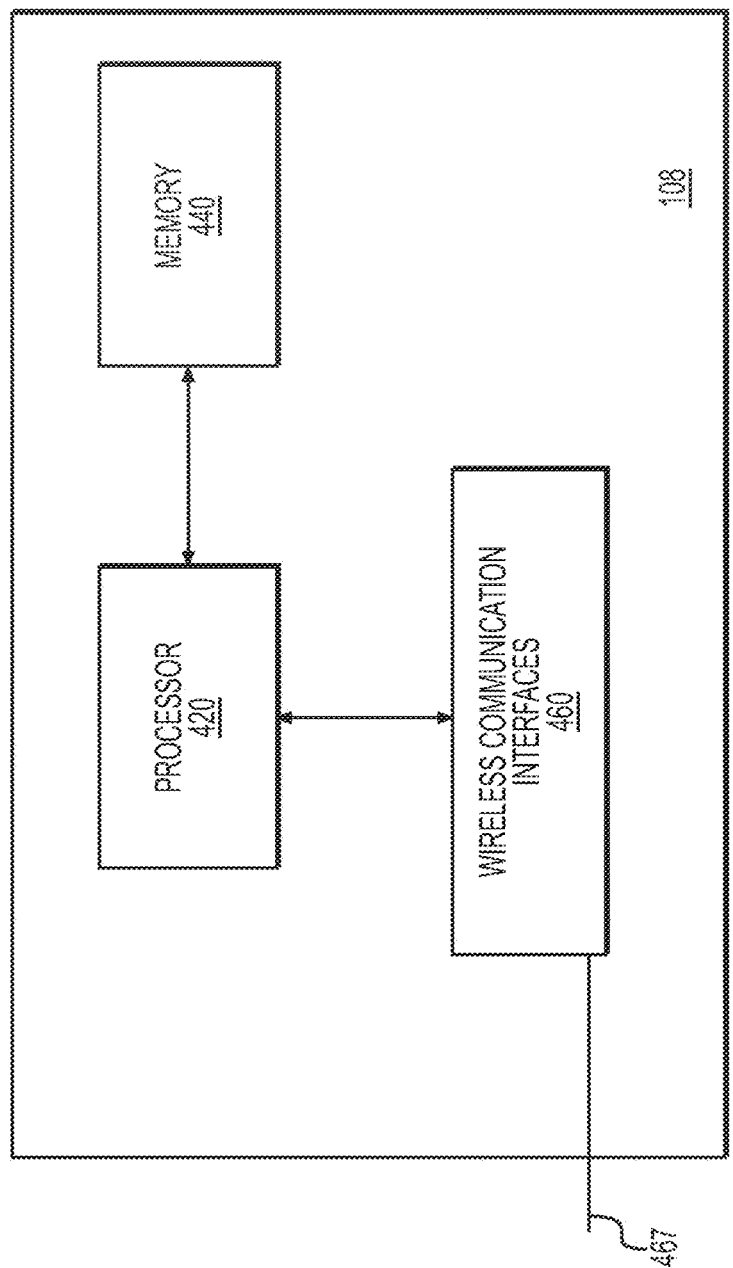
FIG. 4 is a block diagram illustrating the structure of a central unit, according to some example embodiments.

FIG. 4 is a block diagram illustrating the structure of a central unit, according to some example embodiments.

Referring to FIG. 4, the central unit 108 (as described in association with FIG. 1) includes: at least one processor 420 (referred to hereinafter in singular form); a memory 440; and a communication interface 460. The processor 420 is operatively coupled to the memory 440 and the communication interface 460. Operations described herein as being performed by the central unit 108 may be performed by the processor 420 executing program code that includes instructions corresponding to the operations. The instructions may be stored in the memory 440.

Still referring to FIG. 4, the communication interface 460 may include various interfaces including one or more transmitters/receivers connected to one or more connections 467 to transmit/receive wireline signals. According to some example embodiments, the various interfaces include a router/switch interface. The connections 467 may interface the central unit 108 with one or more Top of Rack (ToR) routers. The ToRs may be connected to main routers that connect to a Wireless Area Network (WAN). The memory 240 may store, inter alia, an IP address and zone ID for the central unit. According to some example embodiments, the central unit 108 may be implemented with or without an E1 interface that splits the central unit 108 into control plane and user plane components.

Figure 5:
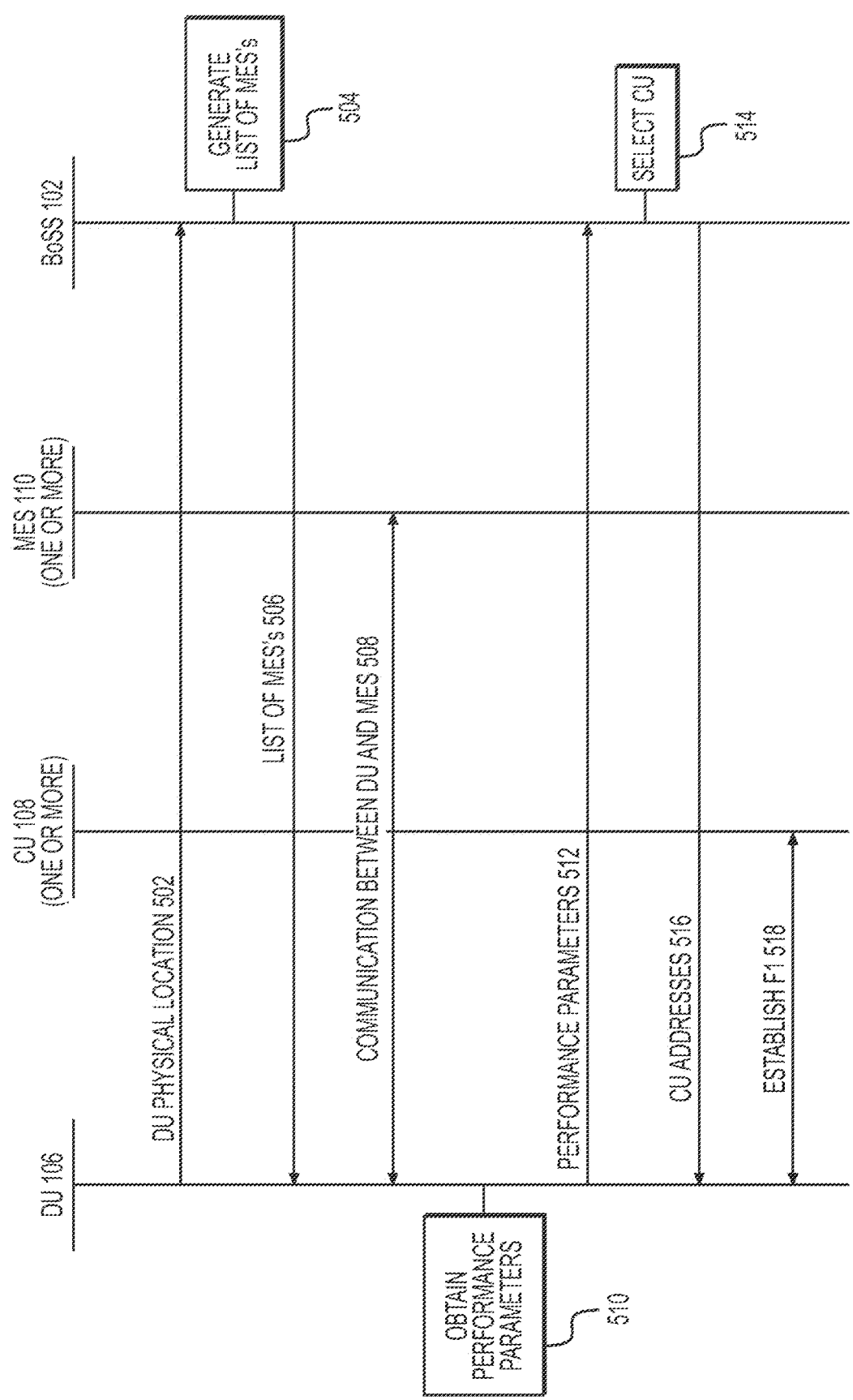
FIG. 5 is a signal flow diagram illustrating a process of linking a distributed unit and a central unit, according to some example embodiments.

FIG. 5 is a signal flow diagram illustrating a process of linking a distributed unit and a central unit, according to some example embodiments.

Referring to FIG. 5, at operation 502, when a distributed unit (DU) 106 is introduced into a wireless communication network 100, the distributed unit 106 sends its physical location (e.g., latitude and longitude) to a BoSS 102 over the IP transport network 112. The distributed unit 106 may be pre-configured with the IP address of the BoSS 102, may be programmed with the IP address of the BoSS 102 by a technician during installation, or may obtain the IP address of the BoSS 102 via a Dynamic Host Configuration Protocol (DHCP) query.

At operation 504, the BoSS 102 selects one or more edge cloud zones 104 based on the physical location of the distributed unit 106. According to some example embodiments, the BoSS 102 may select one or more edge cloud zones 104 within a threshold geographical distance of the physical location. The threshold distance may be set within the BoSS 102, updated by a technician, and/or based on client/application specifications. For example, the BoSS 102 may select one or more edge cloud zones 104 associated with a data center within a threshold geographical distance of the physical location of the distributed unit 106. According to some example embodiments, the threshold distance may be based on changes in network traffic and set to permit a larger number of edge cloud zones 104 and lower network latencies.

The BoSS 102 then generates a list of measurement servers (MES) 110 corresponding to the selected edge cloud zones. The list of measurement servers 110 may include all or some of the measurement servers 110 within the selected edge cloud zones. According to some example embodiments, the BoSS 102 store data identifying the measurements servers 110 associated with each edge cloud zone 104. If there are multiple measurement servers 110 within each selected edge cloud zone, the BoSS 102 may select the measurement server 110 with the lowest workload.

At operation 506, the BoSS 102 provides the list of measurement servers 110 to the distributed unit 106 via the IP transport network 112. At operation 508, the distributed unit 106 communicates with the measurement servers 110 included in the list to determine transport network characteristics (also referred to herein as performance parameters). According to some example embodiments, the transport network characteristics may include network latency and/or packet loss. The distributed unit 106 and the one or more measurement servers 110 may perform Two-Way Active Measurement Protocol (TWAMP) to determine the transport network characteristics. As a person having ordinary skill in the art would be familiar with TWAMP, no further explanation of this protocol is provided herein.

The specific types of network measurements to be performed may be configured at the measurement server 110 to be initiated when the distributed unit 106 communicates with the measurement server 110 in operation 508. The types of measurements may include sets of tests for various packet sizes to determine bandwidth and a number of hops based on the amount of jitter detected with respect to packet size, or sets of tests with Differentiated Services Code Point (DSCP) values to predict the performance for various Quality of Service (QOS) Class Identifiers (QCIs), etc.

According to some example embodiments, each measurement server 110 may be composed of a TWAMP server and a reflector. The distributed unit 106 may implement the TWAMP control client and performs the sender function. During TWAMP, each measurement server 110 copies information into a message received from the distributed unit 106, including timestamps corresponding to when the message was received by the measurement server 110 and when the message was re-sent as a reply message to the distributed unit 106 by the measurement server 110.

At operation 510, the distributed unit 106 obtains the transport network characteristics based on the communications performed in operation 508. According to some example embodiments, the distributed unit 106 receives a reply message from each measurement server 110 including timestamps corresponding to the moments when a message was received by the measurement server 110 and when the message was re-sent as a reply message to the distributed unit 106 by the measurement server 110. The distributed unit 106 may then obtain the transport network characteristics using the timestamps in the received message.

According to some example embodiments, the distributed unit 106 may calculate the transport network characteristics as follows: $((DU_R-DU_T)-(MES_T-MES_R))$, where $DU_R$ represents a time when the reply message from the measurement server 110 is received by the distributed unit 106, $DU_T$ represents a time when the message is transmitted by the distributed unit 106 to the measurement server 110, $MES_T$ represents a time when the reply message is transmitted by the measurement server 110 to the distributed unit 106, and $MES_R$ represents a time when the message transmitted by the distributed unit 106 is received by the measurement server 110.

At operation 512, the distributed unit 106 sends the transport network characteristics determined in operation 510 to the BoSS 102 via the IP transport network 112. At operation 514, the BoSS 102 determines one or more central units 108 to which the distributed unit 106 may connect based on the transport network characteristics determined by the distributed unit 106. According to some example embodiments, operation 514 is a two stage process. In the first stage, the BoSS 102 determines one or more edge cloud zones 104 based on the transport network characteristics. This may include determining the measurement server 110 (or a set number of measurement servers 110) having the lowest latency to the distributed unit 106, fewest packet drops, having a latency to the distributed unit 106 below a defined threshold, and/or having a number of packet drops below a defined threshold.

In the second stage, the BoSS 102 applies one or more factors to the transport network characteristics to determine the one or more central units 108, within the one or more edge cloud zones 104 determined in the first stage, to which the distributed unit 106 may connect. A single distributed unit may connect with a plurality of central units and a plurality of distributed units may connect to the same central unit. The one or more factors may include load balancing, clustering, anti-affinity and routing topology. Load balancing may refer to round-robin priority order among one or more available central units 108 within the determined one or more edge cloud zones 104.

Clustering may include prioritizing geographic proximity between the distributed unit 106 and the one or more central units 108. According to some example embodiments, clustering may include identifying, based on the location of the distributed unit 106, one or more other distributed units 106, currently associated with one or more central units 108, which are geographic neighbors of the distributed unit 106. Geographic neighbor distributed units 106 may correspond to distributed units 106 within a threshold geographical distance from the distributed unit 106. Among the one or more central units 108 to which the one or more neighbor distributed units 106 are mapped, the BoSS 102 selects the central unit 108 having the largest number of neighbor distributed units 106. Clustering may enable faster handovers between neighboring distributed units 106 and simplify multi-connectivity across neighboring distributed units 106.

Anti-affinity may refer to preventing the association of neighboring distributed units 106 to the same central unit 108. According to some example embodiments, anti-affinity may include identifying, based on the location of the distributed unit 106, one or more other distributed units 106, currently associated with one or more central units 108, which are geographic neighbors of the distributed unit 106. Geographic neighbor distributed units 106 may correspond to distributed units 106 within a threshold geographical distance from the distributed unit 106. Among the one or more central units 108 to which the one or more neighbor distributed units 106 are mapped, the BoSS 102 selects the central unit 108 having the fewest number of neighbor distributed units 106. Alternatively, the BoSS 102 may select a different central unit 108 to which no neighbor distributed units 106 are associated. Anti-affinity makes the wireless communications network 100 more robust by reducing the number of distributed units 106 that would fail within a single geographic area if a corresponding central unit 108 failed. According to some example embodiments, anti-affinity may also be used to provide each distributed unit 106 with "standby" links to central units 108 that are in different edge cloud zones 104 to improve geo-redundancy such that the destruction of an entire edge cloud zone 104 due to tornado/fire/earthquake may be overcome by connection to another central unit 108 in a different edge cloud zone 104. Anti-affinity may also include preventing the association of distributed units 106 that are proximate in network topology, to the same central unit 108. For example, preventing the association of distributed unit 106 that use the same number of hops in the IP transport network 112 to reach the same central unit 108.

Routing topology refers to prioritizing proximity in network topology such that the distributed unit 106 is associated with the central unit 108 that is the fewest hops away. According to some example embodiments, the BoSS 102 applies weights to one or more of the above factors to complete the determination of operation 514.

At operation 516, the BoSS 102 sends the IP addresses of the one or more central units 108 determined in operation 514 to the distributed unit 106. At operation 518, the distributed unit 106 establishes an F1 connection to the one or more central units 108 determined in operation 514. According to some example embodiments, the F1 connection is established by transmitting a standard "Setup" message.

The above process has been discussed with a focus on a single distributed unit 106 connecting to a wireless communication network 100. However, according to some example embodiments, the BoSS 102 may trigger batches of distributed units 106 to initiate the above operations. For example, the BoSS 102 may provide each distributed unit 106 in a batch with a specified time at which the operations should be initiated that is contemporaneous with the time of initiation of the remaining distributed units 106 in the batch. This initiation timing may be based on data (e.g., statistical data, stored profiles, etc.) regarding times of high network traffic. By performing the above operations with a batch of distributed units 106, the BoSS 102 is able to assess the transport network characteristics across the entire batch of distributed units 106 in operation 514 to comprehensively determine the one or more central units 108 to which each distributed unit 106 in the batch, respectively, is to connect.

Although the above process has been discussed with a focus towards a distributed unit 106 being introduced into the wireless communication network 100, according to some example embodiments, an existing distributed unit 106 within the wireless communication network 100 may initiate the above operations in order to update the information of the BoSS 102 and potentially connect to a different one or more central units 108. Each distributed unit 106 may re-initiate the above operations periodically.

Figure 6:
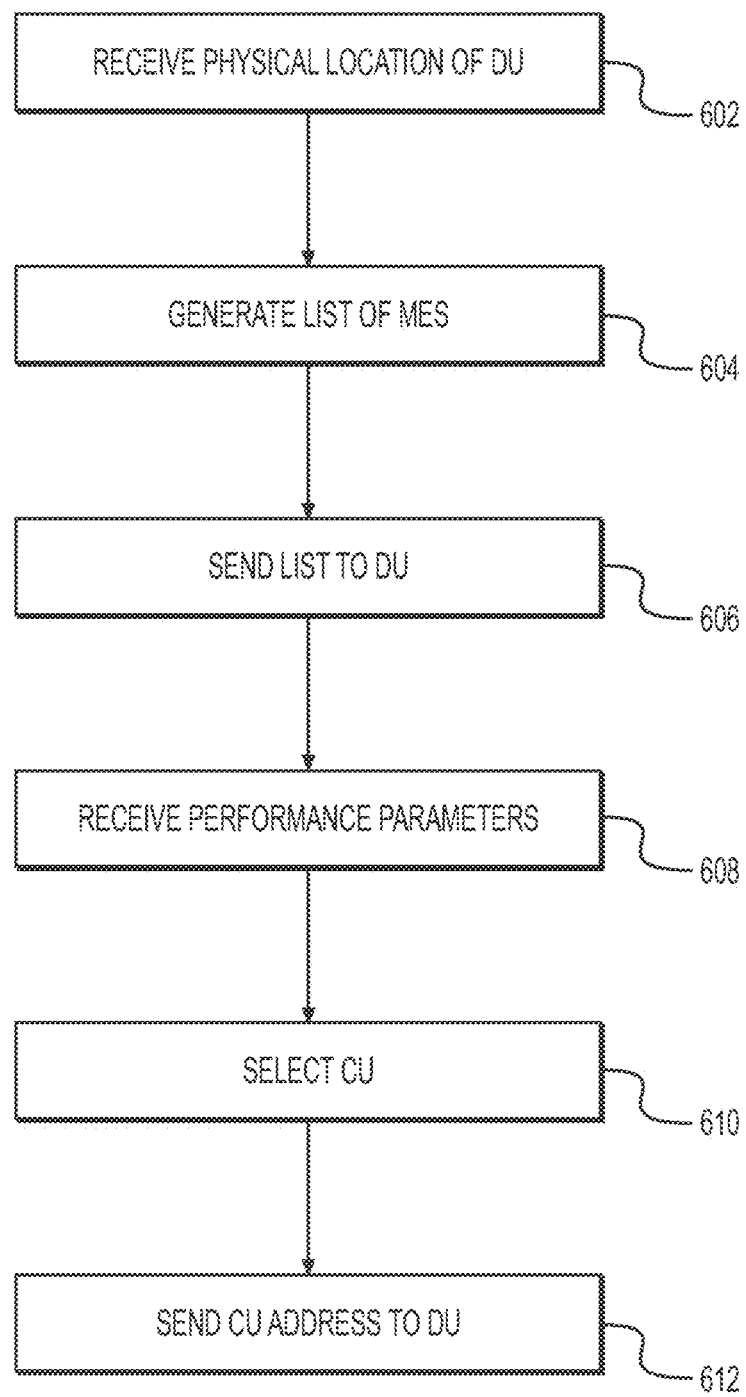
FIG. 6 is a flowchart illustrating a method performed by a BoSS to link a distributed unit and a central unit, according to some example embodiments.

FIG. 6 is a flowchart illustrating a method performed by a BoSS to link a distributed unit and a central unit, according to some example embodiments. Several operations associated with FIG. 6 may correspond to operations discussed in further detail in association with FIG. 5. Redundant description will be omitted.

Referring to FIG. 6, at operation 602, the BoSS 102 may receive the physical location of a distributed unit 106 via the IP transport network 112. At operation 604, the BoSS 102 may generate a list of measurement servers 110 based on the physical location received from the distributed unit 106 in operation 602. According to some example embodiments, the BoSS 102 may generate the list of measurement servers 110 in a manner similar to that discussed in association with operation 504. At operation 606, the BoSS 102 may provide the list of measurement servers 110 generated in operation 604 to the distributed unit 106 via the IP transport network 112. At operation 608, the BoSS 102 may receive performance parameters from the distributed unit via the IP transport network 112 based on the list of measurement servers 110 provided to the distributed unit 106 in operation 606. At operation 610, the BoSS 102 may select one or more central units 108 to which the distributed unit 106 may connect based on the performance parameters. According to some example embodiments, the BoSS 102 may select the one or more central units 108 in a manner similar to that discussed in association with operation 514. At operation 612, the BoSS 102 may send the IP addresses of the one or more central units 108 to the distributed unit 106 via the IP transport network.

Figure 7:
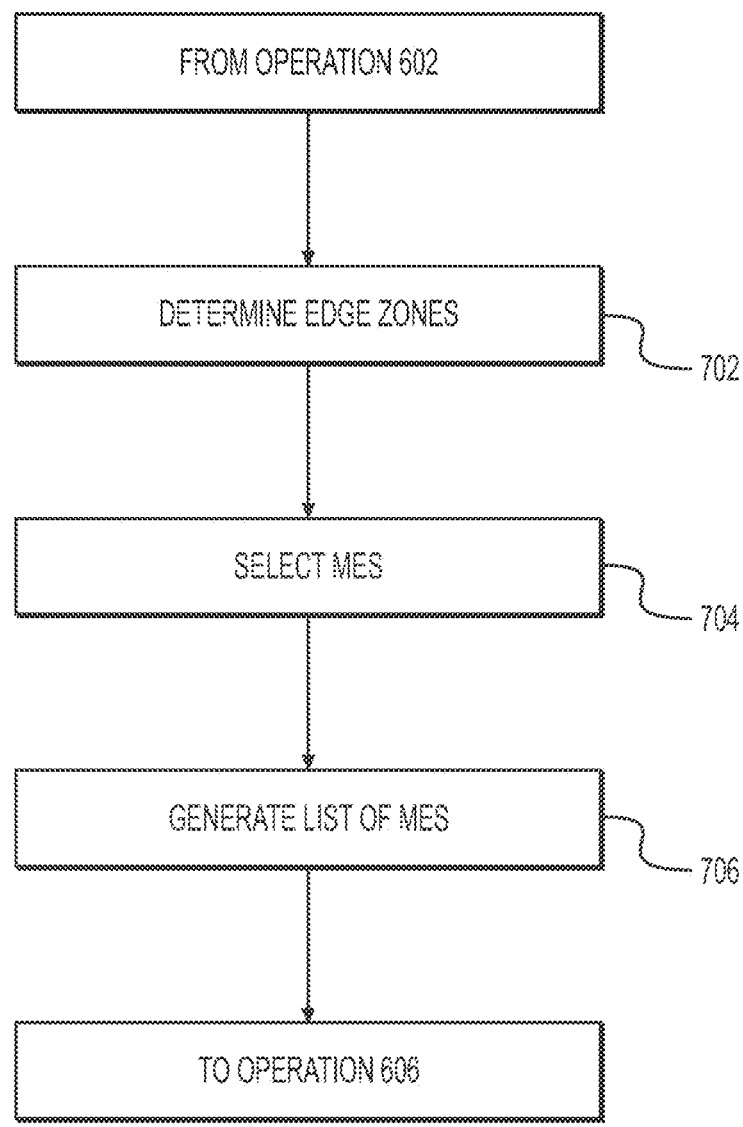
FIG. 7 is a flowchart illustrating a method performed by a BoSS to generate a list of measurement servers, according to some example embodiments.

FIG. 7 is a flowchart illustrating a method performed by a BoSS to generate a list of measurement servers, according to some example embodiments. Several operations associated with FIG. 6 may correspond to operations discussed in further detail in association with FIG. 5 (e.g., operation 504). Redundant description will be omitted.

Referring to FIG. 7, at operation 702, the BoSS 102 may determine one or more edge cloud zones 104 based on the physical location received from the distributed unit 106 in operation 602. At operation 704, the BoSS 102 may select one or more measurement servers 110 based on the determined one or more edge cloud zones 104. At operation 706, the BoSS 102 may generate a list including the selected one or more measurement servers 110.

Figure 8:
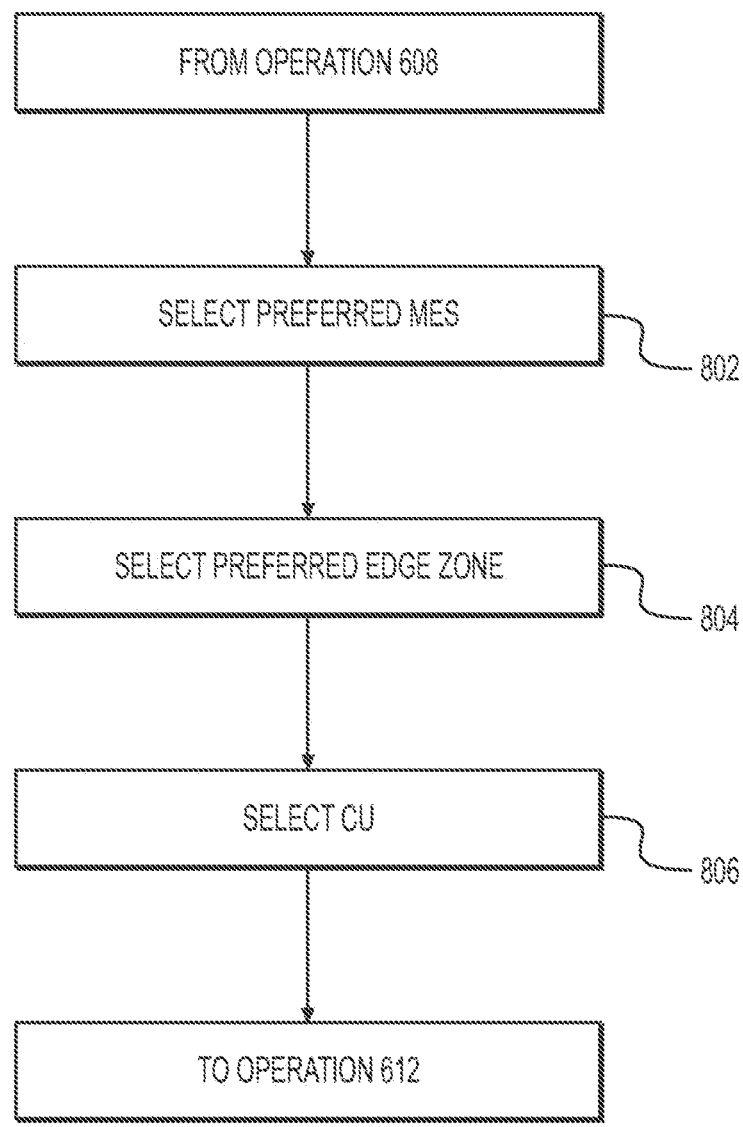
FIG. 8 is a flowchart illustrating a method performed by a BoSS to select a central unit for linking with a distributed unit, according to some example embodiments.

FIG. 8 is a flowchart illustrating a method performed by a BoSS to select a central unit for linking with a distributed unit, according to some example embodiments. Several operations associated with FIG. 6 may correspond to operations discussed in further detail in association with FIG. 5 (e.g., operation 514). Redundant description will be omitted.

Referring to FIG. 8, at operation 802, the BoSS 102 may select one or more selected measurement servers 110 based on the performance parameters received in operation 608. At operation 804, the BoSS 102 may select one or more selected edge cloud zones 104 based on the edge cloud zones 104 in which the one or more selected measurements servers 110 are located. At operation 806, the BoSS 102 may select one or more central units 108 based on the one or more selected edge cloud zones 104.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A central server, comprising:
  a memory storing computer-readable instructions; and
  at least one processor coupled to the memory, the at least one processor configured to execute the computer-readable instructions to,
    receive a physical location of a distributed unit;
    generate a list of one or more measurement servers from a plurality of measurement servers based on the physical location of the distributed unit, the plurality of measurement servers each associated with an edge cloud zone of a plurality of edge cloud zones, each edge cloud zone of the plurality of the edge cloud zones including at least one measurement server of the plurality of measurement servers and at least one central unit of a plurality of central units; and
    send the list of one or more measurement servers to the distributed unit, the sending of the list of one or more measurement servers causing the distributed unit to communicate with each of the one or more measurement servers.

2. The central server of claim 1, wherein the at least one processor is further configured to:
  receive one or more Internet Protocol (IP) transport performance parameters from the distributed unit based on the list of one or more measurement servers;
  select one or more central units based on the one or more IP transport performance parameters; and
  send one or more addresses corresponding to the one or more central units to the distributed unit.

3. The central server of claim 2, wherein the at least one processor is further configured to generate the list of one or more measurement servers by:
  determining one or more edge cloud zones from the plurality of edge cloud zones based on the received physical location of the distributed unit and a physical location of each edge cloud zone of the plurality of edge cloud zones;
  selecting one or more measurement servers corresponding to the determined one or more edge cloud zones; and
  generating the list of one or more measurement servers based on the selected one or more measurement servers.

4. The central server of claim 3, wherein the at least one processor is further configured to select the one or more central units by:
  selecting one or more selected measurement servers based on the one or more IP transport performance parameters;
  selecting the one or more edge cloud zones corresponding to the one or more selected measurement servers; and
  selecting the one or more central units corresponding to the one or more selected edge cloud zones.

5. The central server of claim 4, wherein the at least one processor is further configured to:
  identify one or more neighbor distributed units within a threshold geographic distance of the distributed unit, the one or more neighbor distributed units being currently associated with one or more associated central units; and select the one or more central units based on at least one of,
    (i) a round-robin priority order among one or more available central units within the one or more selected edge cloud zones,
    (ii) selecting the one or more associated central units to which a largest quantity of neighbor distributed units is associated,
    (iii) selecting the one or more associated central units to which a smallest quantity of neighbor distributed unit is associated, and
    (iv) selecting the one or more central units that is a fewest number of hops from the distributed unit.

6. The central server of claim 4, wherein the selecting the one or more selected measurement servers is further based on at least one of:
    (i) a measurement server having a lowest latency,
    (ii) one or more measurement servers having a latency below a defined threshold,
    (iii) a measurement server having a fewest packet drops, and
    (iv) one or more measurement servers having a number of packet drops below a defined threshold.

7. A distributed unit, comprising:
a memory storing computer-readable instructions; and
at least one processor coupled to the memory, the at least one processor configured to execute the computer-readable instructions to,
    send a physical location of the distributed unit to a central server;
    receive a list of one or more measurement servers from the central server based on the physical location of the distributed unit, the one or more measurement servers selected from a plurality of measurement servers each associated with an edge cloud zone of a plurality of edge cloud zones, each edge cloud zone of the plurality of edge cloud zones including at least one measurement server of the plurality of measurement servers and at least one central unit of a plurality of central units;
    communicate with each of the one or more measurement servers;
    obtain one or more internet Protocol (IP) transport performance parameters associated with each of the one or more measurement servers based on the communications;
    send the one or more IP transport performance parameters to the central server;
    receive one or more addresses corresponding to one or more central units from the central server based on the one or more IP transport performance parameters; and
    establish an F1 connection with the one or more central units using the one or more addresses.

8. The distributed unit of claim 7, wherein the list of one or more measurement servers is generated by the central server by:
    determining one or more edge cloud zones from the plurality of edge cloud zones based on the received physical location of the distributed unit and a physical location of each edge cloud zone of the plurality of edge cloud zones;
    selecting one or more measurement servers corresponding to the determined one or more edge cloud zones; and
    generating the list of one or more measurement servers based on the selected one or more measurement servers.

9. The distributed unit of claim 8, wherein the one or more central units are selected by the central server by:
    selecting one or more selected measurement servers based on the one or more IP transport performance parameters;
    selecting the one or more edge cloud zones corresponding to the one or more selected measurement servers; and
    selecting the one or more central units corresponding to the one or more selected edge cloud zones.

10. The distributed unit of claim 7, wherein one or more IP) transport performance parameters include at least one of latency and packet loss.

11. The distributed unit of claim 7, wherein the communication includes Two-Way Active Measurement Protocol.

12. The distributed unit of claim 7, wherein the distributed unit is configured to perform at least one of physical network functions, virtual network functions, or any combination thereof.

13. A method performed by a central server, comprising:
receiving a physical location of a distributed unit;
generating a list of one or more measurement servers from a plurality of measurement servers based on the physical location of the distributed unit, the plurality of measurement servers each associated with an edge cloud zone of a plurality of edge cloud zones, each edge cloud zone of the plurality of edge cloud zones including at least one measurement server of the plurality of measurement servers and at least one central unit of a plurality of central units; and
sending the list of one or more measurement servers to the distributed unit, the sending of the list of one or more measurement servers causing the distributed unit to communicate with each of the one or more measurement servers.

14. The method of claim 13, further comprising:
receiving one or more Internet Protocol (IP) transport performance parameters from the distributed unit based on the list of one or more measurement servers;
selecting one or more central units based on the one or more IP transport performance parameters; and
sending one or more addresses corresponding to the one or more central units to the distributed unit.

15. The method of claim 14, wherein the generating includes:
    determining one or more edge cloud zones from the plurality of edge cloud zones based on the received physical location of the distributed unit and a physical location of each edge cloud zone of the plurality of edge cloud zones;
    selecting one or more measurement servers corresponding to the determined one or more edge cloud zones; and
    generating the list of one or more measurement servers based on the selected one or more measurement servers.

16. The method of claim 15, wherein the selecting the one or more central units includes:
    selecting one or more selected measurement servers based on the one or more IP transport performance parameters;
    selecting the one or more edge cloud zones corresponding to the one or more selected measurement servers; and
    selecting the one or more central units corresponding to the one or more selected edge cloud zones.

17. The method of claim 16, further comprising:
identifying one or more neighbor distributed units within a threshold geographic distance of the distributed unit, the one or more neighbor distributed units being currently associated with one or more associated central units, wherein the selecting the one or more central units is based on at least one of,
  (i) a round-robin priority order among one or more available central units within the one or more selected edge cloud zones,
  (ii) selecting the one or more associated central units to which a largest quantity of neighbor distributed units is associated,
  (iii) selecting the one or more associated central units to which a smallest quantity of neighbor distributed unit is associated, and
  (iv) selecting the one or more central units that is a fewest number of hops from the distributed unit.

18. The method of claim 14, wherein the one or more IP transport performance parameters include at least one of latency and packet loss.

19. The method of claim 14, wherein the one or more IP transport performance parameters are determined using Two-Way Active Measurement Protocol.

20. The method of claim 14, wherein the distributed unit uses the one or more addresses corresponding to the one or more central units to establish an F1 connection to at least one of the one or more central units.

* * * * *